United States Patent
Miller

(10) Patent No.: US 9,597,615 B2
(45) Date of Patent: Mar. 21, 2017

(54) FLOW DEVELOPMENT CHAMBER AND SEPARATOR

(71) Applicant: SpiroFlo Holdings, Inc., Littleton, CO (US)

(72) Inventor: Alan Miller, Littleton, CO (US)

(73) Assignee: SpiroFlo Holdings, Inc., Littleton, CO (US)

( * ) Notice: Subject to any disclaimer, the term of this patent is extended or adjusted under 35 U.S.C. 154(b) by 525 days.

(21) Appl. No.: 14/075,589

(22) Filed: Nov. 8, 2013

(65) Prior Publication Data

US 2014/0061141 A1 Mar. 6, 2014

Related U.S. Application Data

(63) Continuation-in-part of application No. 13/891,672, filed on May 10, 2013, now abandoned, which is a continuation of application No. 13/231,851, filed on Sep. 13, 2011, now Pat. No. 8,461,706, which is a continuation of application No. 12/647,275, filed on Dec. 24, 2009, now Pat. No. 8,026,621, which is a
(Continued)

(51) Int. Cl.
*B01D 21/26* (2006.01)
*B04C 3/06* (2006.01)

(52) U.S. Cl.
CPC .............. *B01D 21/267* (2013.01); *B04C 3/06* (2013.01)

(58) Field of Classification Search
CPC .................................. B01D 21/267; B04C 3/06
See application file for complete search history.

(56) References Cited

U.S. PATENT DOCUMENTS

| 622,474 A | 4/1899 | Hoskin |
| 2,361,150 A | 10/1944 | Petroe |

(Continued)

FOREIGN PATENT DOCUMENTS

| GB | 2257476 | 1/1993 |
| JP | 56077565 | 6/1981 |

(Continued)

OTHER PUBLICATIONS

International Search Report for International Application No. PCT/US06/04510, dated Oct. 26, 2007, 1 page.

*Primary Examiner* — David A Reifsnyder
(74) *Attorney, Agent, or Firm* — Russell T. Manning; Marsh Fischmann & Breyfogle LLP

(57) ABSTRACT

A fluid handling and separation system has an inlet conduit for receiving a helical fluid flow, a housing connected to the inlet conduit, a collection conduit disposed within the housing in axially alignment with the inlet conduit, and a diversion conduit in fluid communication with the interior of the housing. The housing encloses the collection conduit to form an annular space between the interior surface of the housing and an exterior surface of the collection conduit. Upon receiving a helical flow via the inlet conduit, a radially outward portion of the helical flow is separated from a radially inner portion of the helical flow. The radially outward portion of the helical flow is diverted through the diversion conduit while the radially inward portion of the helical flow is received by the collection conduit. Such a system allows for separating the helical fluid flow by density of materials or fluids within the helical fluid flow.

20 Claims, 18 Drawing Sheets

Related U.S. Application Data continuation of application No. 11/290,152, filed on Nov. 29, 2005, now Pat. No. 7,663,261.

(60) Provisional application No. 60/653,548, filed on Feb. 15, 2005.

(56) References Cited

U.S. PATENT DOCUMENTS

| | | | |
|---|---|---|---|
| 2,949,540 | A | 8/1960 | Clayton |
| 4,108,721 | A | 8/1978 | Drzewiecki et al. |
| 4,155,022 | A | 5/1979 | Crockett |
| 4,159,426 | A | 6/1979 | Staton |
| 4,176,283 | A | 11/1979 | McLaren |
| 4,224,527 | A | 9/1980 | Thompson |
| 4,274,009 | A | 6/1981 | Parker |
| 4,308,464 | A | 12/1981 | Yamamoto |
| 4,392,063 | A | 7/1983 | Lindquist |
| 4,500,228 | A | 2/1985 | McDonald et al. |
| 4,555,637 | A | 11/1985 | Irvine |
| 4,740,711 | A | 4/1988 | Sata et al. |
| 4,753,535 | A | 6/1988 | King |
| 4,834,343 | A | 5/1989 | Boyes |
| 5,167,483 | A | 12/1992 | Gardiner |
| 5,298,818 | A | 3/1994 | Tada |
| 5,344,619 | A | 9/1994 | Larwick et al. |
| 5,977,649 | A | 11/1999 | Dahill |
| 6,011,334 | A | 1/2000 | Roland |
| 6,155,751 | A | 12/2000 | Lane et al. |
| 6,249,059 | B1 | 6/2001 | Hosoda |
| 6,412,709 | B1 | 7/2002 | Sugiura |
| 6,441,508 | B1 | 8/2002 | Hylton |
| 6,509,049 | B1 | 1/2003 | Parsons et al. |
| 6,595,179 | B1 | 7/2003 | Kanno |
| 6,599,422 | B2 * | 7/2003 | Constantine ......... B01D 21/267 210/512.3 |
| 6,659,118 | B2 | 12/2003 | Lane et al. |
| 6,661,112 | B2 | 12/2003 | Zeier et al. |
| 6,749,374 | B1 | 6/2004 | Lane et al. |
| 6,811,302 | B2 | 11/2004 | Fleischli et al. |
| 7,066,207 | B2 | 6/2006 | Lane et al. |
| 7,082,955 | B2 | 8/2006 | Lane et al. |
| 7,160,024 | B2 | 1/2007 | Dougherty, Sr. et al. |
| 7,357,565 | B2 | 4/2008 | Gopalan et al. |
| 7,661,872 | B2 | 2/2010 | Daniels et al. |
| 7,663,261 | B2 | 2/2010 | Miller et al. |
| 8,026,621 | B2 | 9/2011 | Miller et al. |
| 2001/0003291 | A1 | 6/2001 | Uematsu et al. |
| 2003/0072214 | A1 | 4/2003 | Fleischli et al. |
| 2003/0102038 | A1 | 6/2003 | Lane et al. |
| 2003/0201646 | A1 | 10/2003 | Kaploun |
| 2004/0074534 | A1 | 4/2004 | Lane et al. |
| 2004/0146394 | A1 | 7/2004 | Turchetta |
| 2004/0238654 | A1 | 12/2004 | Hagen et al. |
| 2005/0000581 | A1 | 1/2005 | Lane et al. |
| 2007/0028976 | A1 | 2/2007 | Lane et al. |
| 2007/0138797 | A1 | 6/2007 | Reidy et al. |
| 2010/0096857 | A1 | 4/2010 | Miller |

FOREIGN PATENT DOCUMENTS

| | | |
|---|---|---|
| JP | 60240878 | 11/1985 |
| WO | 2006/088714 | 8/2006 |

* cited by examiner

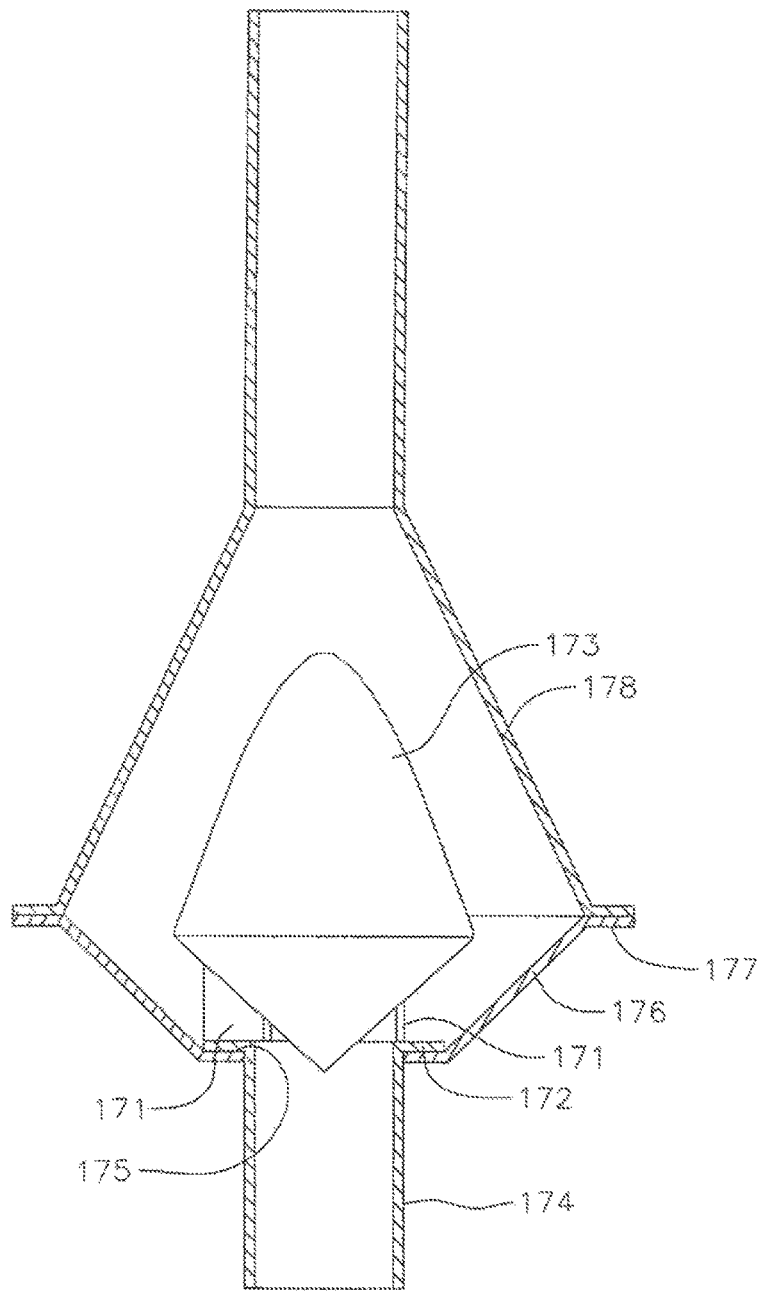

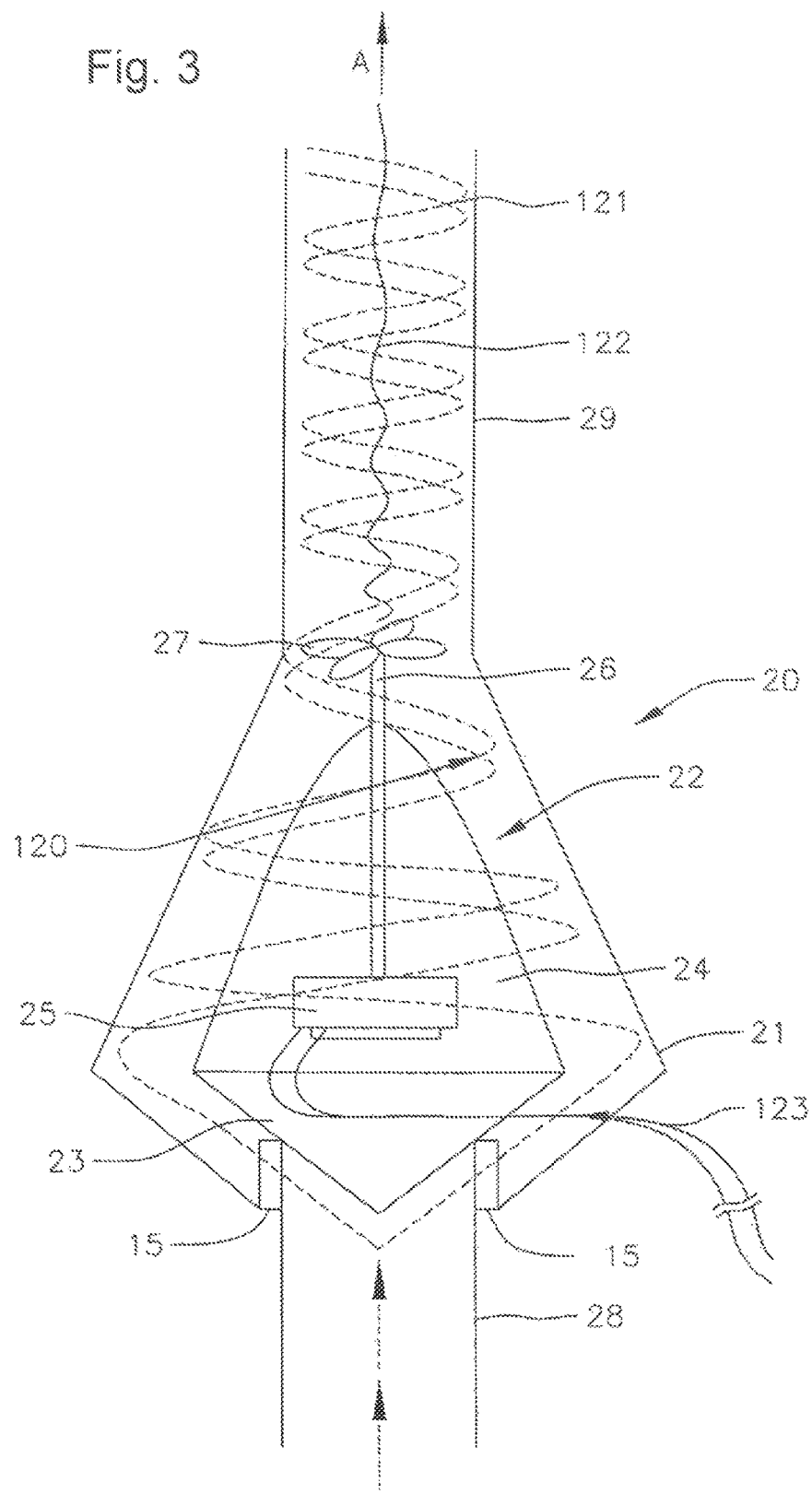

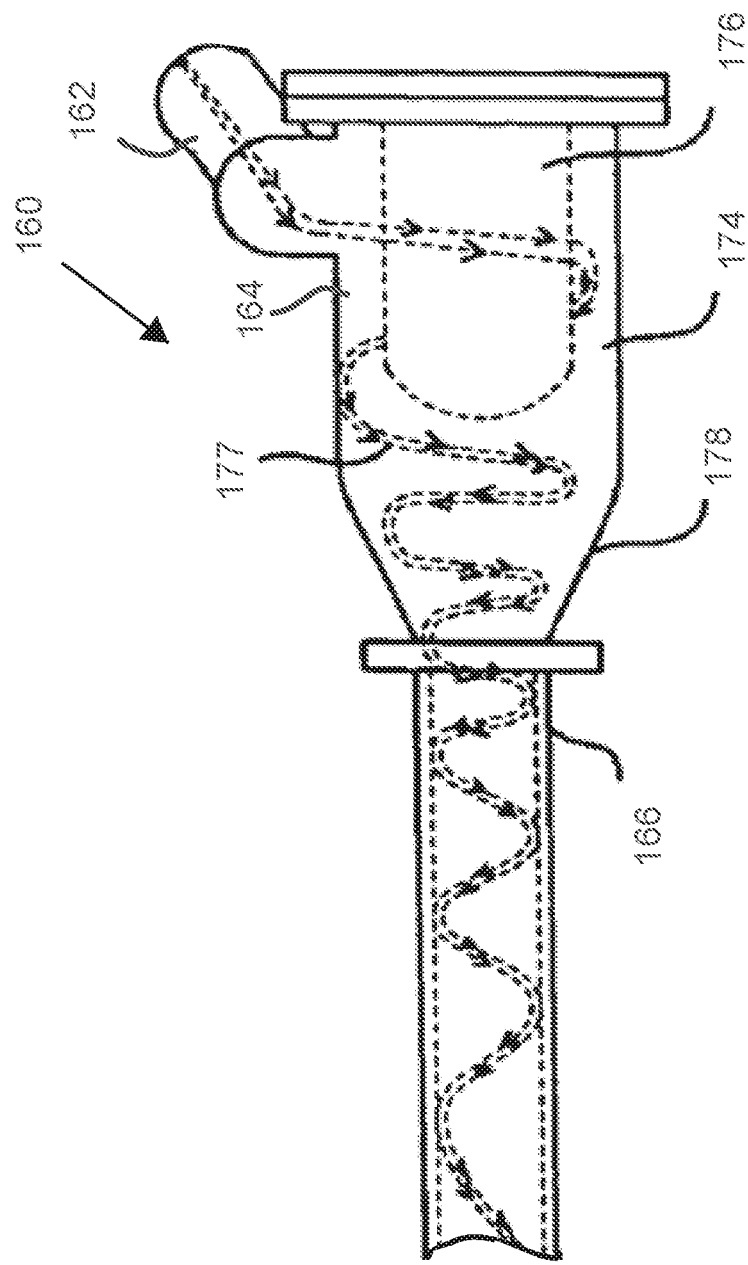

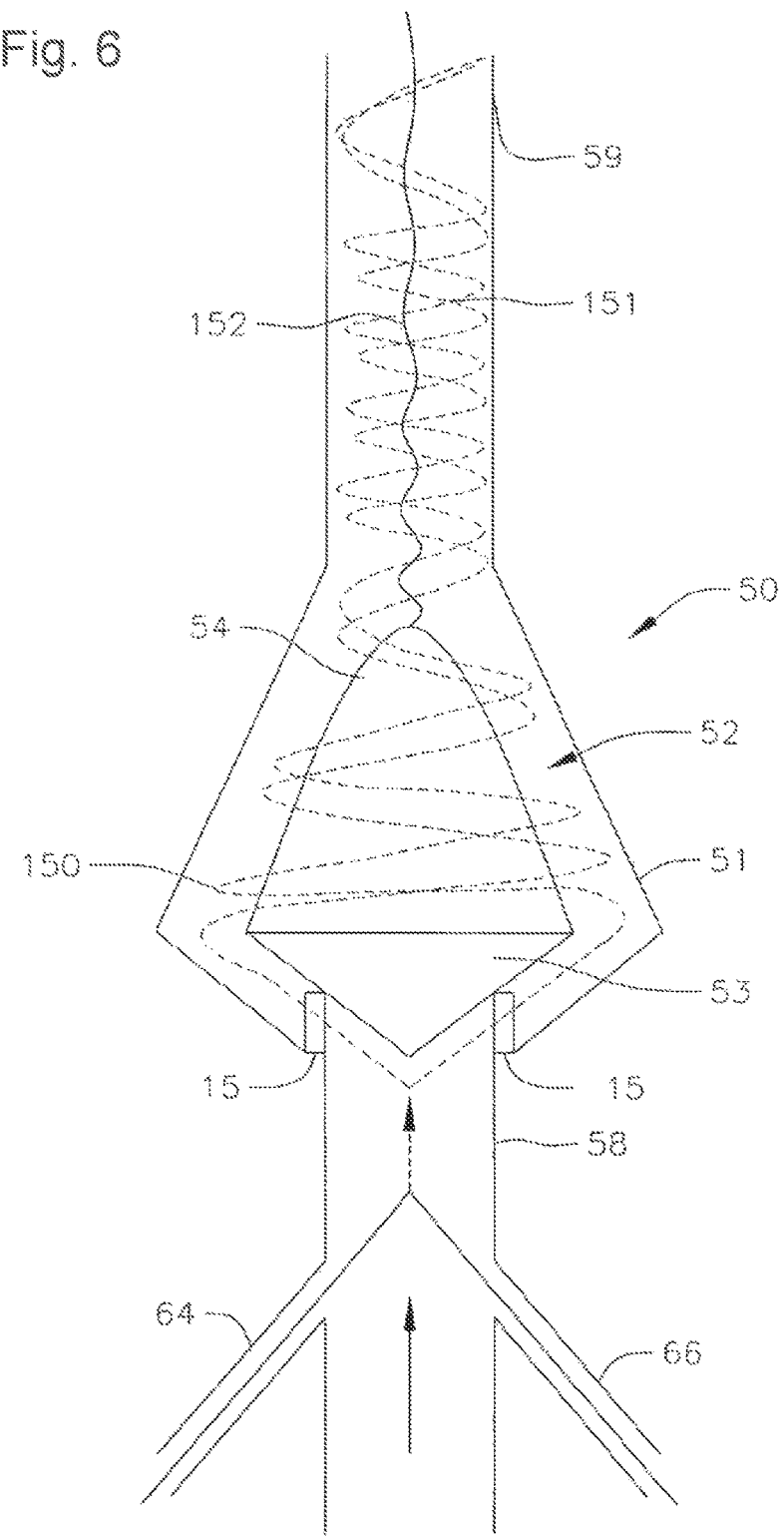

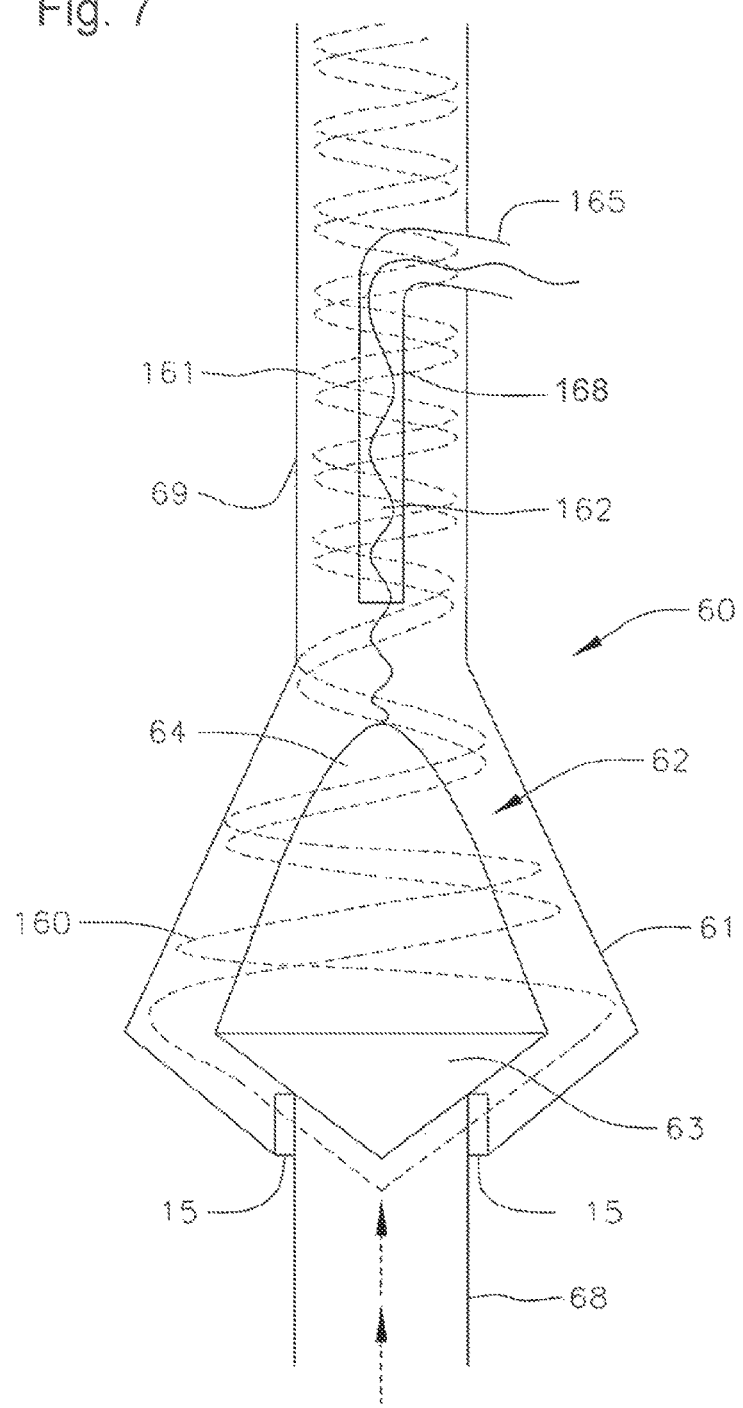

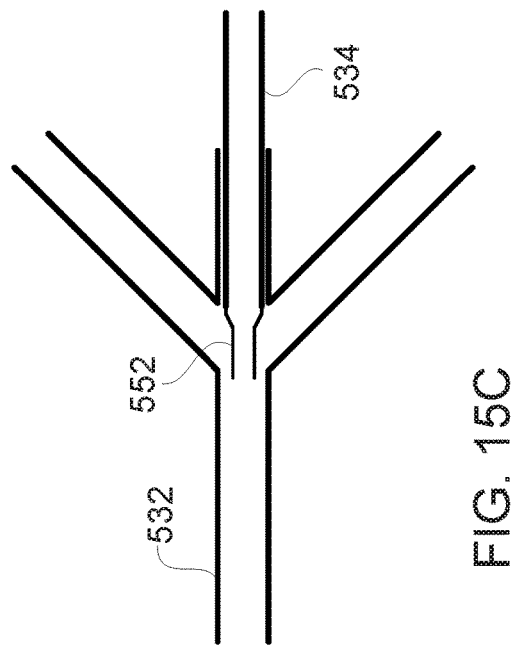
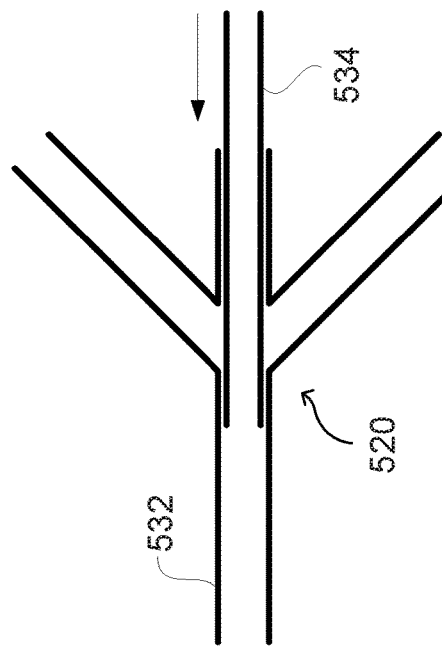
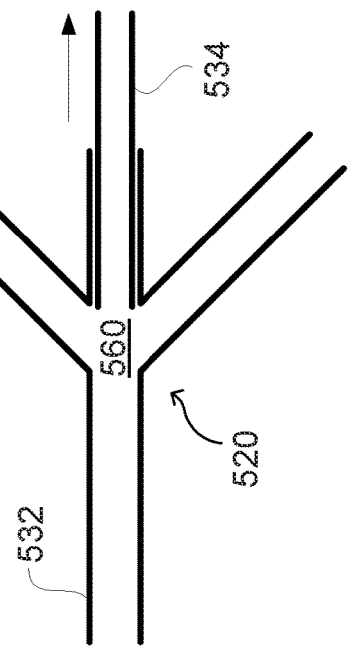
FIG. 15C
FIG. 15A
FIG. 15B

FLOW DEVELOPMENT CHAMBER AND SEPARATOR

CROSS-REFERENCE TO RELATED APPLICATION (S)

This application is a continuation-in-part of U.S. patent application Ser. No. 13/891,672, filed May 10, 2013, abandoned, which application is a continuation of application Ser. No. 13/231,852, filed Jan. 5, 2012, now U.S. Pat. No. 8,461,706, issued on Jun. 11, 2013, which application is a continuation of U.S. patent application Ser. No. 12/647,275, filed Dec. 24, 2009, now U.S. Pat. No. 8,026,621 issued on Sep. 27, 2011, which application is a continuation of U.S. patent application Ser. No. 11/290,152 filed Nov. 29, 2005, now U.S. Pat. No. 7,663,261, issued on Feb. 16, 2010, which claims the benefit of U.S. Provisional Patent Application No. 60/653,548, filed Feb. 15, 2005, the entire disclosures of which are incorporated fully herein by reference.

BACKGROUND

Fluids, such as gases, liquids, combinations of gases, liquids and/or solids (e.g., particulates) are often transported in pipelines or other conduits in a pressurized fluid flow. Examples of such transportation systems include, pneumatic conveying systems, high and low pressure natural gas pipelines, flow lines, gathering systems, vapor recovery systems, coal bed methane gas lines, oil pipelines, water pipelines, etc.

In many fluid transportation systems, it is desirable or necessary to separate different components carried in the pressurized fluid flow. For instance, it may be necessary to separate mineral tailings from water, natural gas liquids from oil and/or natural gas, etc. In such systems, it is often necessary to provide a processing facility for the separation of different component from a fluid flow. Accordingly, it would be beneficial if different components could be separated from the fluid flow in-transit to reduce or eliminate separate processing facilities.

SUMMARY

Provided herein are systems and methods (i.e., utilities) that allow for separating different components of a fluid flow in an in-line process. The presented utilities are based on the principle that different components of a fluid flow often have different material properties including, without limitation, densities, masses, viscosities, specific gravities, and that these different properties may be utilized to effectively separate the different components.

In one exemplary embodiment of the presented utilities, a flow development chamber generates a spiral or helical material flow which imparts centrifugal forces on components of the material flow. Such components of the material flow may include, without limitation, particulates in a gaseous and/or liquid flow and/or fluids having differing properties within the fluid flow. In an exemplary the case where particulate matter is denser or of greater mass than a fluid in which it is admixed, the helical motion of the fluid serves to increase the concentration of the particulate matter in the radially outward layers of the helical flow. In contrast, where particulates matter is less dense or has a mass that is less than the fluid in which it is admixed, the fluid is concentrated radially outward displacing the less particulate matter to the radially inner layers of the helical flow. In the case of a flow having fluids (e.g., gases and/or liquids) of differing properties (e.g., densities, specific gravities, viscosities, etc.) variations in the properties between the fluids likewise results in the stratification of such fluids. For instance, denser fluids will concentrate at radially outer layers of the helical fluid flow, while less dense fluids concentrate to the radially inner layers of the helical flow. Other properties may likewise result in similar stratification. Such a flow development chamber may include a housing having an inlet and an outlet with a diverter disposed within the housing for imparting the helical flow to incoming materials. Such a diverter may operate in an axial configuration wherein the inlet and outlet are axially aligned or in a tangential configuration wherein the inlet and outlet are non-aligned.

In one embodiment of the presented utilities, a separator is adapted to receive a helical flow from the flow development chamber. The separator uses the motion of the helical flow developed in the flow development chamber to separate different radial portions of the helical flow, which have different properties. The separator generally includes an inlet conduit that is fluidly coupled to an incoming helical flow. At least a first collection conduit is disposed within the separator such that a first collection inlet of the first collection conduit is axially aligned with the inlet conduit. In this regard, the first collection inlet is aligned with a central axis of a flow path of the helical flow. As the helical flow passes through the separator, a radially outward portion of the helical flow is disposed between an outside surface of the first collection conduit and inside surface of the separator. This radially outward portion of the helical flow is diverted into a diversion conduit, which is in fluid communication with the space between the outside surface of the first collection conduit and an inside surface of the separator. The remainder of the helical flow is directed into the first collection inlet of the first collection conduit. That is, a first radially inward portion of the helical flow continues through the first collection conduit and is thus separated from the radially outward portion of the helical flow. Such a separator may be utilized alone or in conjunction with the flow development chamber. That is, the separator may be utilized with any helical flow regardless of its origin.

In various embodiments, one or more additional collection conduits may be disposed within the separator. In this regard, a second collection conduit may be nested within the first collection conduit such that a second collection inlet is axially aligned with the central axis of the flow path of the helical flow. In such an arrangement, a second radially inner portion of the helical flow may be separated from the first radially inner portion of the helical flow and the radially outer portion of the helical flow. Alternatively, first and second (or more) separators may be disposed in-line to separate multiple radial portions of a helical flow.

In one embodiment, the separator may further include an expansion or compression chamber between the outlet of the inlet conduit and the collection inlet of the collection conduit. Such an expansion or compression chamber may decrease or increase, respectively, the diameter of the incoming helical flow to alter the velocity of the helical flow. This change in the velocity of the helical flow may facilitate separation of desired radial portions of the helical flow.

In another embodiment, the position of the collection inlet of the collection conduit may be adjustable along the length of the axis of the helical flow path. Such adjustment may allow for increasing or decreasing the inner radial portion of the helical flow that is collected by the collection conduit.

BRIEF DESCRIPTION OF THE DRAWINGS

The detailed description of embodiments of the invention will be made with reference to the accompanying drawings, wherein like reference numerals designate corresponding parts in the figures, in which:

FIG. 2B is an assembled sectional view of the flow development chamber of FIG. 2A;

FIG. 3 shows a side view of another embodiment of a flow development chamber;

FIG. 5 shows a perspective view of a fluid flow through the tangential flow chamber of FIG. 4;

FIG. 6 shows a flow development chamber according to one embodiment of the present invention used to mix two flowable fluids; and FIG. 7 shows a flow development chamber according to one embodiment of the present invention used to separate two flowable fluids.

FIGS. 15A and 15B illustrate advancement and retraction of a collection conduit in the wye separator of FIG. 13;

FIG. 15C illustrates another embodiment of the wye separator of FIG. 13.

Figure 1A:
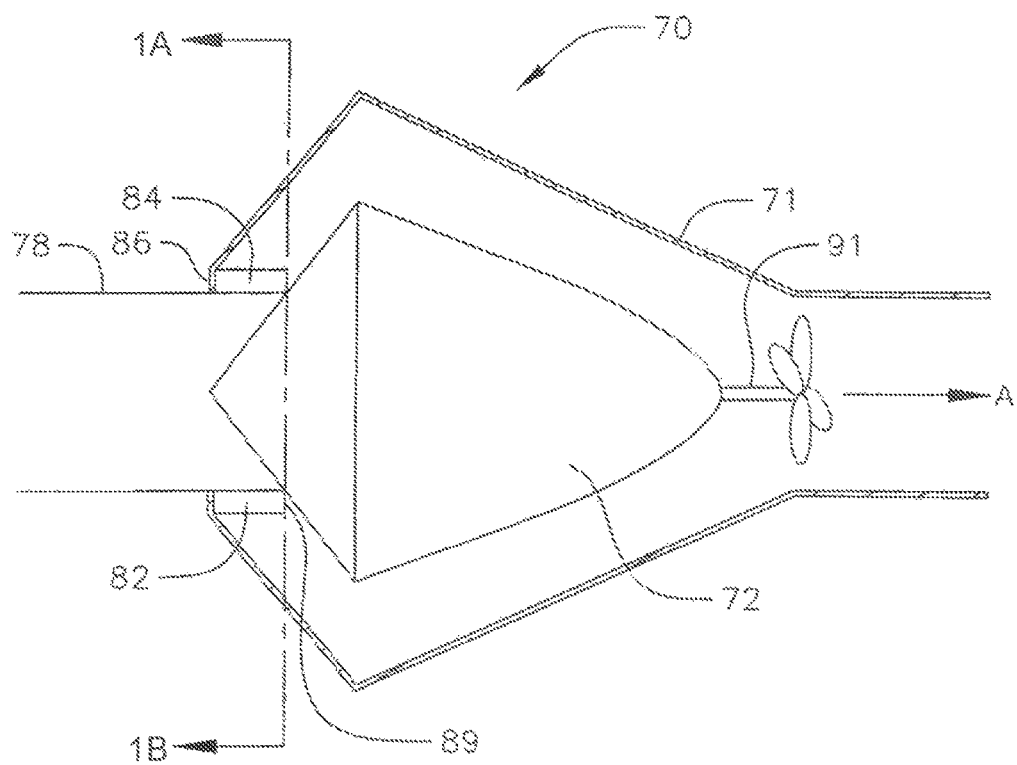
FIG. 1A shows a side view of a first embodiment of a flow development chamber.

Before any embodiment of the invention is explained in detail, it is to be understood that the invention is not limited in its application to the details of construction and arrangements of components set forth in the following description, or illustrated in the drawings. The invention is capable of alternative embodiments and of being practiced or being carried out in various ways. Furthermore, it is to be understood that the terminology used herein is for the purpose of illustrative description and should not be regarded as limiting

DETAILED DESCRIPTION

As a fluid passes through a flow development chamber of the type described in U.S. Pat. No. 7,082,955, the beneficial nature of the spinning, spiral or helical flow developed in the fluid may be harnessed to separate the fluid into separate streams based on the densities, masses or other properties of the component parts of the fluid. As utilized herein, the term "fluid" is broadly applied to include all flowable materials. That is, the term fluid includes not only gases and liquids but also combinations of gases, liquids and/or particulates entrained within such gases and liquids. Further, the term fluid may also include flowable solids, which may be mixed with another flowable solid, liquid and/or gas.

Figure 1B:
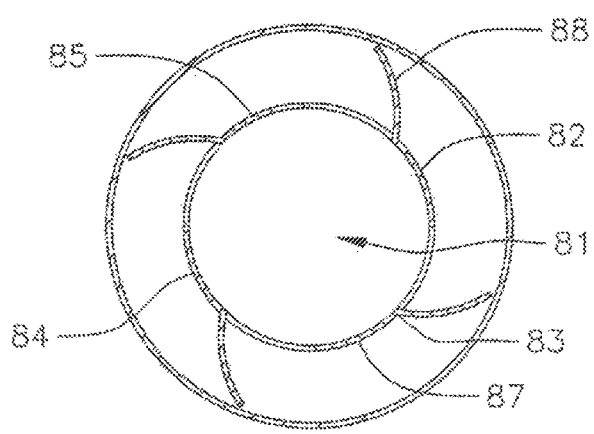
FIG. 1B shows a sectional view along line 1B-1B of the flow development chamber of FIG. 1A (the inner body omitted for illustration purposes)

Referring to FIGS. 1A and 1B, a first embodiment of a flow development and chamber 70 is shown. The flow development chamber 70 includes a housing 71 enclosing an inner body 72. In the exemplary embodiment shown, both the housing 71 and the inner body 72 are both formed radially symmetrically along a central axis, and have a double conical shape overall with a widest central diameter or equator, and taper off along the central axis away from the equator. When a fluid is circulated around the inner body 72 within the housing 71 in the direction of the arrow A as shown, an organized flow may be developed. Optionally, a shaft mounted propeller 91 may be attached to the inner body 72 as shown in FIG. 1A to harness this organized flow. By harnessing the organized flow using the propeller 91 or another method, electricity may be generated. The blades of the propeller may be located in the chamber 70 or in the downstream pipe.

The housing 71 may be connected to an inlet pipe 78 by a plate 86, or the inlet pipe 78 may be directly connected to the inlet end of the housing 71 through the use of an adhesive, a weld or other appropriate means known to one skilled in the art. Deflecting vanes 82, 83, 84, 85 (as shown in FIG. 1B), which may also be called diverters, are formed from a downstream end (in the direction of the arrow A) of the inlet pipe 78.

The deflecting vanes 82, 83, 84, 85 aid in the development of the organized flow of fluid around the inner body 72 within the housing 71, and may be formed by making four axial cuts into the downstream end of the inlet pipe 78 and a circumferential cut toward one side to form a flap. The flap is then deflected outwardly to form the projecting portion of the deflecting vanes 82, 83, 84, 85. Accordingly, the end of the inlet pipe 78 includes four circular tube portions that are the inner portions 87 of the deflecting vanes 82, 83, 84, 85 and four outwardly projecting portions that are the projecting portions 88 of the deflecting vanes. Accordingly, in this embodiment, a double arcuate shape of the deflecting vanes 82, 83, 84, 85 is formed in a radial direction perpendicular to the central axis. These deflecting vanes 82, 83, 84, 85 have an upstream side adjacent to the plate 86 and a downstream side 89 axially, and an inner portion 87 and a projecting portion 88 radially. In the embodiment shown, the deflecting vanes 82, 83, 84, 85 project axially from the inlet pipe 78. In this embodiment, the deflecting vanes 82, 83, 84, 85 deflect the fluid flow around the inner body 72.

Figure 2A:
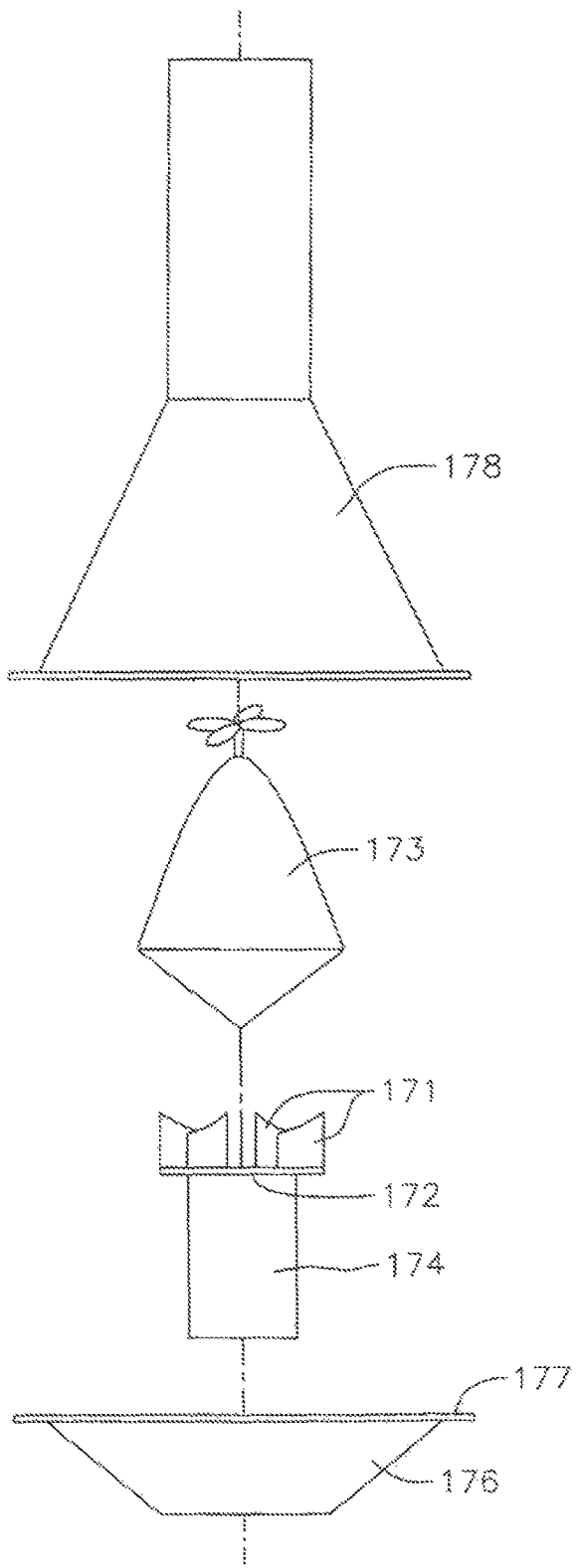
FIG. 2A is an exploded view of an alternative embodiment of a flow development chamber.

Referring now to FIG. 1B, a top view of a portion of the exterior housing of the flow development chamber 70 of FIG. 2A is shown taken along the section 1B-1B of FIG. 1A. Deflecting vanes 82, 83, 84, 85 are depicted in FIG. 1B which outline an inner concentric circle 81.

As shown in FIG. 1A, deflecting vanes 82, 83, 84, 85 radially contact the outer housing 71 with the upstream ends of their projecting portions 88 and support the inner body 72 with the downstream ends of their inner portions 87. In an alternative embodiment of the invention, the deflecting vanes 82, 83, 84, 85 project radially in a line.

In alternative embodiments, the deflecting vanes 82, 83, 84, 85 may be variously angled, curved or otherwise modified to aid in the development of the organized flow as the fluid passes around the inner body. Additional alternative embodiments exist wherein less than four, as well as more than four, deflecting vanes are provided, and wherein these deflecting vane or vanes are mounted in either clockwise or counter-clockwise patterns. The deflecting vanes may be set at angles of 90 degrees, or at angles greater to or less than 90 degrees to the curve of the outlet.

FIGS. 2A-2D show further alternative embodiments of a flow development chamber having deflecting vanes 171 provided on a plate 172 fixed to the inlet pipe 174. The deflecting vanes 171 may be provided as individual pieces mounted directly to the plate 172 using an adhesive, fasteners or another appropriate method. The plate 172 may then be mounted to the inlet pipe 174 using a similar method. The plate and vane assembly mounted on the inlet pipe 174 may then be passed through an opening in a lower housing part 176 so that the plate 172 rests on an inner top surface 175 of the housing part 176. These may be bolted, welded, screwed together or otherwise fixedly attached. The housing part 176 is provided with a flange 177 so that it may engage with an upper housing part 178 to provide an exterior enclosure for the flow development chamber. These may be bolted, welded, screwed together or otherwise fixedly attached. The deflecting vanes may be provided to support an inner body 173, and may be provided with an angled edge 179 (see FIG. 2C) to better engage the surface of the inner body 173 along the full length of the downstream surface of the vane.

Figure 2C:
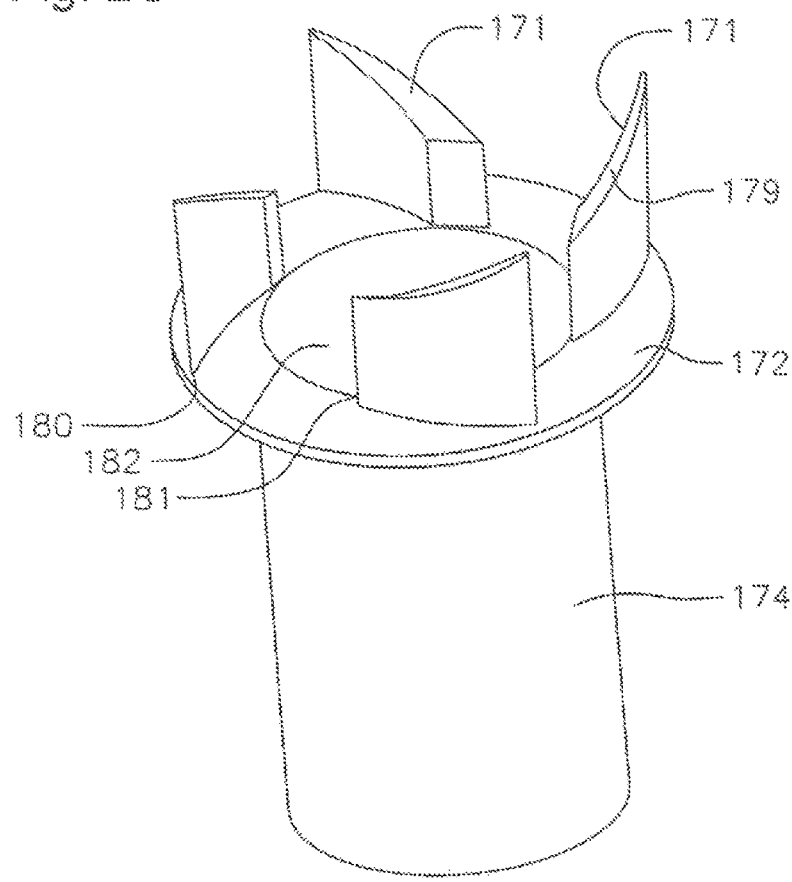
FIG. 2C is a perspective view of a deflector arrangement having angled ends for the flow development chamber of FIG. 2A.
Figure 2D:
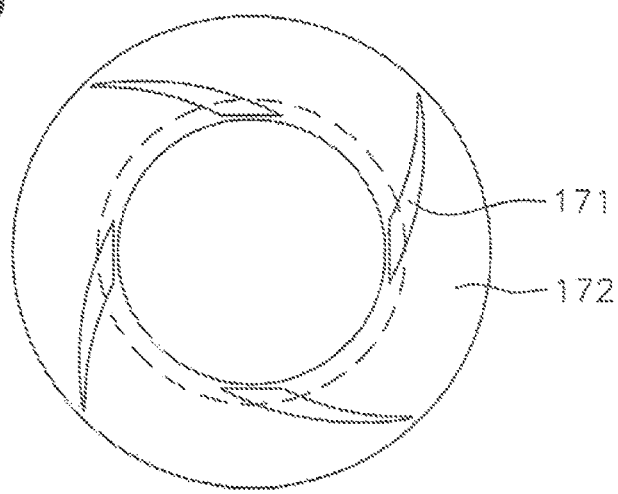
FIG. 2D is an end view of FIG. 2C.

FIGS. 2C and 2D show the deflecting vanes 171 mounted on the plate 172 in a spiral pattern between the outer radius 180 and the inner radius 181 and a circular passage 182 through the plate 172. In an alternative embodiment, the deflecting vanes 171 may have flat edges (not shown) such that the full length of the downstream surface of the vane is a flat surface lying in a plane parallel to plate 172. In yet a further embodiment, the deflecting vanes may have a double arcuate surface on the inside and a single arcuate surface on the outside. In any embodiment, it will be appreciated that the deflecting vanes may be secured directly to the outer housing and/or inner housing and may comprise many configurations that cause incoming fluid to circulate around the inner body and traverse the annular space between the outer housing and inner body from the deflecting vanes to the outlet end of the chamber.

FIG. 3 shows another embodiment of a flow development chamber in operation. It will be appreciated that the deflector arrangements described above or other suitable arrangements may be used. FIG. 3 for example shows one such embodiment wherein a fluid passes through a flow development and generation chamber 20 in the direction of arrow A. The chamber 20 comprises a housing 21 connected to an inlet pipe 28 and an outlet pipe 29, and enclosing an inner body 22. Deflecting vanes 15 are provided in the chamber adjacent the inlet pipe or formed from an upstream end of the inlet pipe 28. As above, the deflecting vanes 15 aid in the development of the organized flow as a fluid passes around the inner body 22 within the housing 21. The inner body 22 itself may comprise a first section 23 and a second section 24 joined to one another.

Although the embodiment of the inner body 22 shown is provided in two separate sections, the second rounded section 24 and the first pointed section 23, it will be understood by those skilled in the art that the inner body may comprise any combination of a first section which is either rounded or pointed, and a second section which is also either rounded or pointed. The sections of the inner body may be conical or substantially conical and include a portion extending into the housing of the flow development chamber or into the conduits adjacent to the flow development chamber for greater stability. In still other embodiments, various shapes can be utilized to make up the sections of the inner body, including non-concentric sections. In a more general embodiment, the inner body may comprise a single section, broadly conical in shape, pointed in the direction of the source of the fluid flow. In yet another embodiment, the inner body may be spherical, cylindrical, or any appropriate shape known to one skilled in the art.

The housing 21 shown in FIG. 3 is formed from a pair of conical portions to match the inner body 22 so that an annular space is provided between the interior surface of the housing 21 and the exterior surface of the inner body 22. However as with the inner body 22, many variations in shape are possible for the housing 21, e.g., the housing 21 may be spherical, cylindrical, or any appropriate shape known to one skilled in the art. The housing 21 may also be made from a variety of materials, although if the chamber 20 is to process hard particulate matter it is preferable that the material be a durable material capable of contacting a wide variety of substances without sustaining substantial damage. In various alternative embodiments, materials used for the housing may comprise aluminum, stainless steel, copper, brass, black metal, rubber, plastic, ceramic, fiber-glass, and composites or other durable materials. One or more of these materials may also be used to manufacture the other components of the flow development chamber as well.

After entering the inlet pipe 28 of the chamber 20, the fluid is deflected and travels through the annular space between the interior surface of the housing 21 and the exterior surface of the inner body 22. At this point, the fluid develops a steady organized spiral or vortex flow 120. This organized flow 120, which is a combination of a sink flow and an irrotational vortex flow, is a counterclockwise flow in the embodiment shown when viewed along an axis running between the inlet pipe 28 and the outlet pipe 29 although in an alternative embodiment a clockwise flow is also possible.

As the organized flow 120 moves through the chamber 20 it accelerates and Taylor vortices, in the form of a boundary layer flow, begin to form along the inner surface of the housing 21 such that the forming boundary layer flow surrounds the organized flow 120. The flow then travels out of the chamber 20 into the outlet pipe 29 coupled to the chamber 20. The organized flow 120 continues to travel through the outlet pipe 29 as a spiraling vortex flow 122 surrounded by a helical flow 121. The length of the organized flow 120 can vary with the volume of fluid or product mass.

As shown in FIG. 3, the chamber 20 is provided with an inner body 22 having both a second section 24 and a first section 23. The first section 23 is fixably mounted within the housing 21 of the chamber 20. In one embodiment, the first section 23 of the inner body may be held in place using the diverters 15 in a manner illustrated with reference to FIGS. 1A and 1B. The housing 21 may be affixed to the diverters with adhesive, or as an alternative they may be welded or melded together. An optional micro generator 25 may be located inside the inner body 22 in the embodiment shown. Such a micro-generator may be connected to a shaft 26 which passes through the second section 24, on which shaft in turn is mounted a propeller 27. As such the armature of the micro turbine 25 may be turned by the action of the organized flow, and preferably the spiraling vortex flow 122, created in the chamber 20, which organized flow acts on the propeller 27 to rotate the propeller and shaft 26.

In an alternative embodiment of a flow development chamber, the inlet pipe may be configured to allow the fluid to enter the flow development chamber tangentially, rather than along the central axis of the chamber as shown in FIG.

Figure 4:
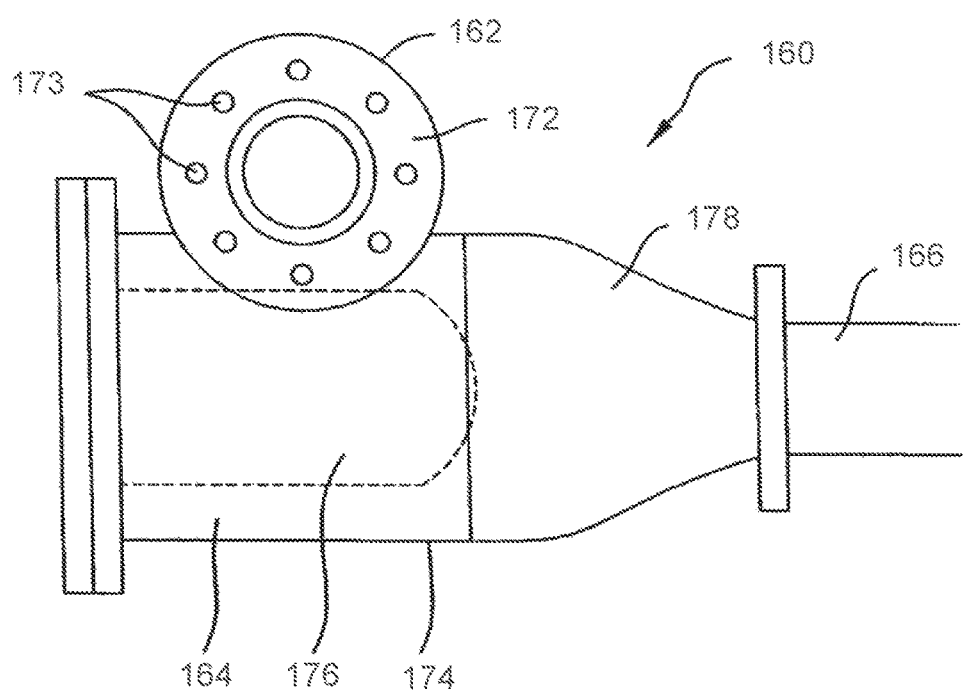
FIG. 4 shows a side view of a tangential flow development chamber.

4. As shown, the tangential flow development chamber 160 includes an inlet conduit 162, an annular chamber 164 and an outlet conduit 166. Preferably, the inlet conduit 162 is a pipe, although any conduit, such as, for example, a hose, which is capable of receiving a fluid is suitable. As shown in FIGS. 4 and 5, the inlet conduit 162 includes a first inlet end having a coupling flange 172 and a second outlet end which is fluidly coupled to the mixing chamber 164, wherein both the first end and the second end are open.

The coupling flange 172 extends radially outward from the first end of the inlet conduit 162 and has a plurality of openings 173 for receiving fasteners. The coupling flange 172 may be coupled to a fluid supply source such that the inlet conduit 162 is in fluid communication with the fluid source and can receive incoming fluids and particulates.

The annular chamber 164 is defined by an outer barrel 174, which at least partially defines a housing of the flow development chamber, an inner barrel 176 and an accelerating chamber 178. The outer barrel 174 includes a hollow interior having an inner diameter that is larger than the outer diameter of the inner barrel 176. The space between the outer barrel 174 and inner barrel 176 define an annular space. In the illustrated embodiment, the inner barrel 176 includes a cylindrical section with a hemispherical end portion. The accelerating chamber 178 is connected to the distal end of the outer barrel 174 and is generally conical in shape. That is, it reduces in diameter from the end connected to the outer barrel 174 to its outlet, which may be connected to an outlet conduit or pipe 166.

When fluid flows through the inlet conduit 162 of the tangential flow chamber 160, the fluid flows around the inner surface of the outer barrel 174 and the outer surface of the inner barrel 176. This leads to the development of the steady counterclockwise flow (when viewed from the back of the chamber) of the mixture in the outer barrel 174. Stated otherwise, the inner and outer barrels in conjunction with the orientation of the inlet conduit define a diverter that imparts a spiral or helical flow to received fluids. In other embodiments, the inlet conduit 162 may be mounted to the opposite side of the outer barrel 174 such that the gas/material mixture flows in a clockwise direction.

As more fluid flows into the annular chamber 164, the fluid traverses the length of the inner barrel 176 while flowing counterclockwise around its outer surface until it reaches the hemispherical end of the inner barrel. After passing over the hemispherical end of the inner barrel 176, the fluid flow forms an organized flow 177, which is a combination of a sink flow and an irrotational vortex flow, and is accelerated through the accelerating chamber 178. As above, the organized flow 177 continues to travel through the outlet pipe 166 as a spiraling vortex flow surrounded by a helical flow. The tangential flow chamber is more fully discussed in U.S. Pat. No. 7,082,955, FIGS. 2, 3A, 3B, 7, etc. and the accompanying text.

FIG. 6 depicts a flow development chamber 50 employed to aid in the mixing of two flowable materials such as a liquid with another liquid, a liquid with a gas, or a gas with another gas. A flowable solid may also be mixed with another flowable solid, liquid and/or gas. After meeting and flowing together in the inlet pipe 58 from feed pipes 64 and 66, these substances continue into a housing 51 flowing over an inner body 52. Deflecting vanes 15 are provided in the chamber adjacent to the inlet pipe or formed from an upstream end of the inlet pipe 58. As above, the deflecting vanes 15 aid in the development of a vortex flow 150 as a fluid passes over the inner body 52 within the housing 51, which vortex flow 150 mixes the two substances.

In another embodiment, a flow development chamber may be employed to separate rather than mix a plurality of substances by creating and selectively diverting parts of an organized flow. These substances may include flowable solids as well as liquids and gasses. FIG. 7 shows a flow development chamber 60 which may be used to establish an organized flow wherein a liquid and a gas, liquids of different densities, or gases of different densities may be separated into a spiraling vortex flow 162 and a helical flow 161 around the spiraling flow. Deflecting vanes 15 are formed from an upstream end of an inlet pipe 68 or otherwise provided. As above, the deflecting vanes 15 aid in the development of the organized flow as a fluid passes over an inner body 62 within a housing 61. In the embodiment shown, an organized stream of air in the spiraling flow 162 is separated from a water mixture in the helical flow 161 and collected in a diverter pipe 168 inserted into the housing 61 of the chamber 60 and ejected from an outlet pipe 165. Because of its ability to remove air from a water-air mixture, the chamber 60 may for example be used with a stream of water intended for a fire hose to provide a more effective flame suppressant stream.

The diverter pipe 168 and outlet pipe 165 may be supported within the chamber 60 by attachment to the housing 61 of the chamber 60 at the point at which outlet pipe 165 passes through the housing 61. In this way, the portion of the diverter pipe 164 running lengthwise through the interior of the housing 61 of the chamber 60 forms a cantilever member relative to its attachment point at the housing 61. In the embodiment shown, the outlet pipe 165 exits the housing 61 close to the end of the outlet pipe 69 so that the extent of disruption of the helical and spiraling flows 161 and 162 is minimized.

The diverter pipe 168 may be supported within the outlet pipe 69 using pins or struts (not shown) passing between the outlet pipe 69 and the diverter pipe 164. The organized flow within the chamber 60 may be disrupted by these pins. However, if these pins are small enough in diameter it is likely that any such disruption to the organized flow will be minimal. In the event that the diverter pipe 164 or its supports does disrupt the organized flow within the chamber 60, a second flow development chamber may be provided downstream from the disruption to reestablish the organized flow.

While discussed above, in relation to removing water from an air/water mixture, it will be further appreciated that matter/particulates entrained within a fluid flow or, in the case of mixed fluids, the fluids themselves are influenced by the centrifugal forces acting within the helical or spiral flow. For instance, where particulate matter is denser or of greater mass than a fluid in which it is admixed, the helical motion of the fluid serves to increase the concentration of the particles in the radially outward layers of the fluid. In contrast, where particulates matter is less dense or has a lower mass than the fluid in which it is admixed, the fluid is concentrated radially outward forcing the particulate matter to the radially inner layers. Further, variations in the relative properties between different mixed fluids likewise results in the stratification of such fluids. For example, in the case of mixed fluids with differing densities (e.g., oil, butane, propane, water, etc.), the denser fluids or liquids will concentrate radially outer layers, while the less dense liquids and/or gases concentrate to the radially inner parts of the helical fluid flow. Other properties are likewise influenced by the centrifugal forces acting on the fluid and/or particulates within the fluid. Such properties include, without limitation, specific gravity, specific weight, specific volume, viscosity, particulate size, etc. In the following discussion of FIGS. 8A-15, separation of fluids is described in terms of fluid density separation for purposes of simplifying the discussion. However, it will be expressly understood that such discussion is presented by way of example and not by way of limitation. That is, the separation of fluids described in FIGS. 8A-15 may be based on any appropriate fluid property.

Figure 8A:
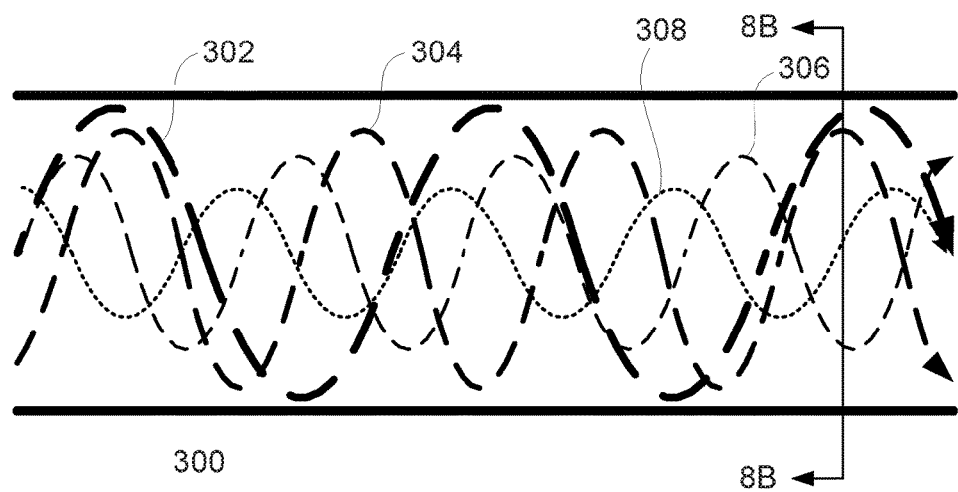
FIG. 8A shows a cross-sectional side view of a pipe carrying a mixed fluid flow.
Figure 8B:
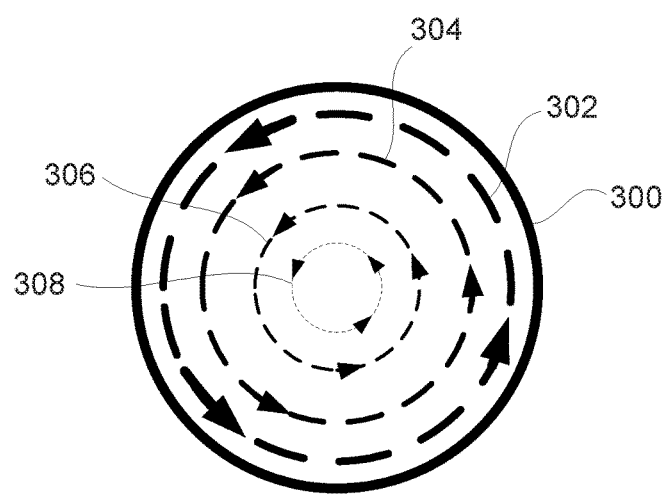
FIG. 8B shows a sectional view along line 8B-8B of the mixed fluid flow of FIG. 8A.

FIG. 8A illustrates a cross-sectional side view of a pipe 300 carrying an organized flow of mixed fluids. As shown, the organized flow is a generally helical flow which may include a vortex at its center (not shown). In the illustrated embodiment, the density of the fluids and/or particulates within the fluid is represented by the thickness of the lines representing the different components of fluids or particulates (hereafter "fluids"). In this regard, fluid 302 is the densest fluid, fluid 304 is the second densest fluid, fluid 306 is a less dense fluid, and fluid 308 is the least dense fluid in the organized fluid flow. As shown, each of these fluids 302-308 rotate around the center of the pipe 300 at different radial distances from the center of the pipe based on their densities. As noted above, the denser the fluid the more radially outward the fluid is displaced from the center of the pipe 300. This is best illustrated in cross-sectional view 8B. As shown, each of the different fluids 302-308 in the helical flow are displaced to different radial locations as measured from the center of the pipe 300. Accordingly, it has been recognized that, by providing a separator that allows for isolating one or more different radial layers of the helical fluid flow, mixed fluids may be effectively separated in-transit/in-line. Stated otherwise, the ability to generate a helical flow of a fluid and particulate mixture and/or mixed fluids via either an axial flow generator or a tangential flow generator (or other means) enables the separation of the particulates and/or mixed fluids. More specifically, by providing one or more axially aligned collection pipes or conduits within a helical flow, different fluids may be separated from the helical flow.

Figure 9A:
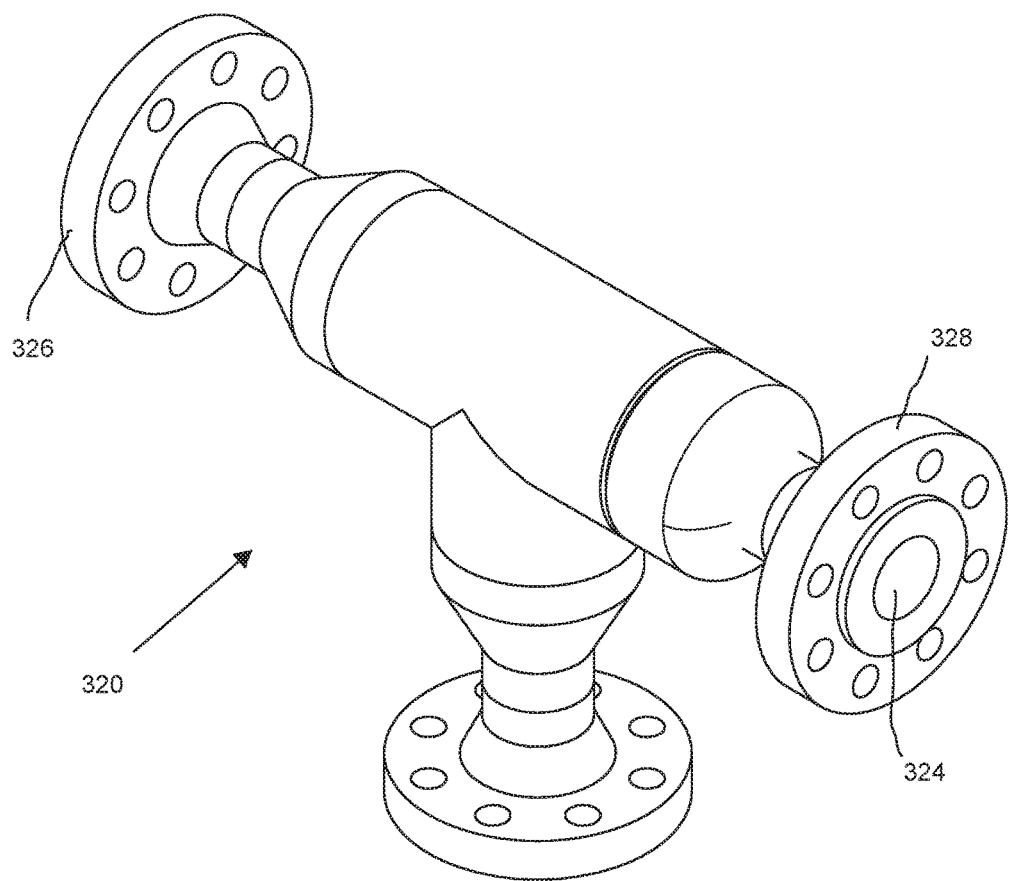
FIGS. 9A and 9B show a perspective and a cross-sectional side view, respectively, of one embodiment of a separator.
Figure 9B:
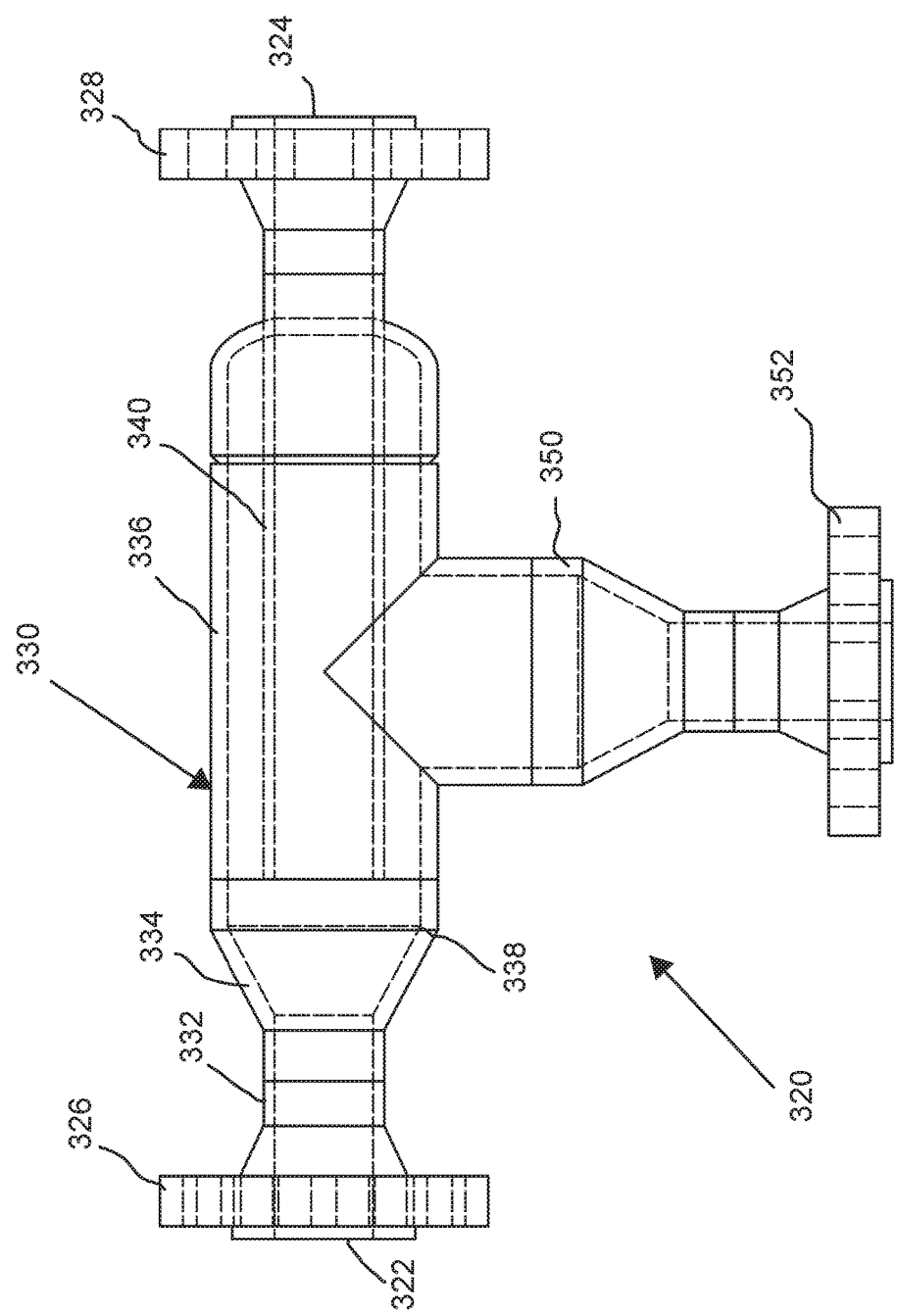
Figure 10:
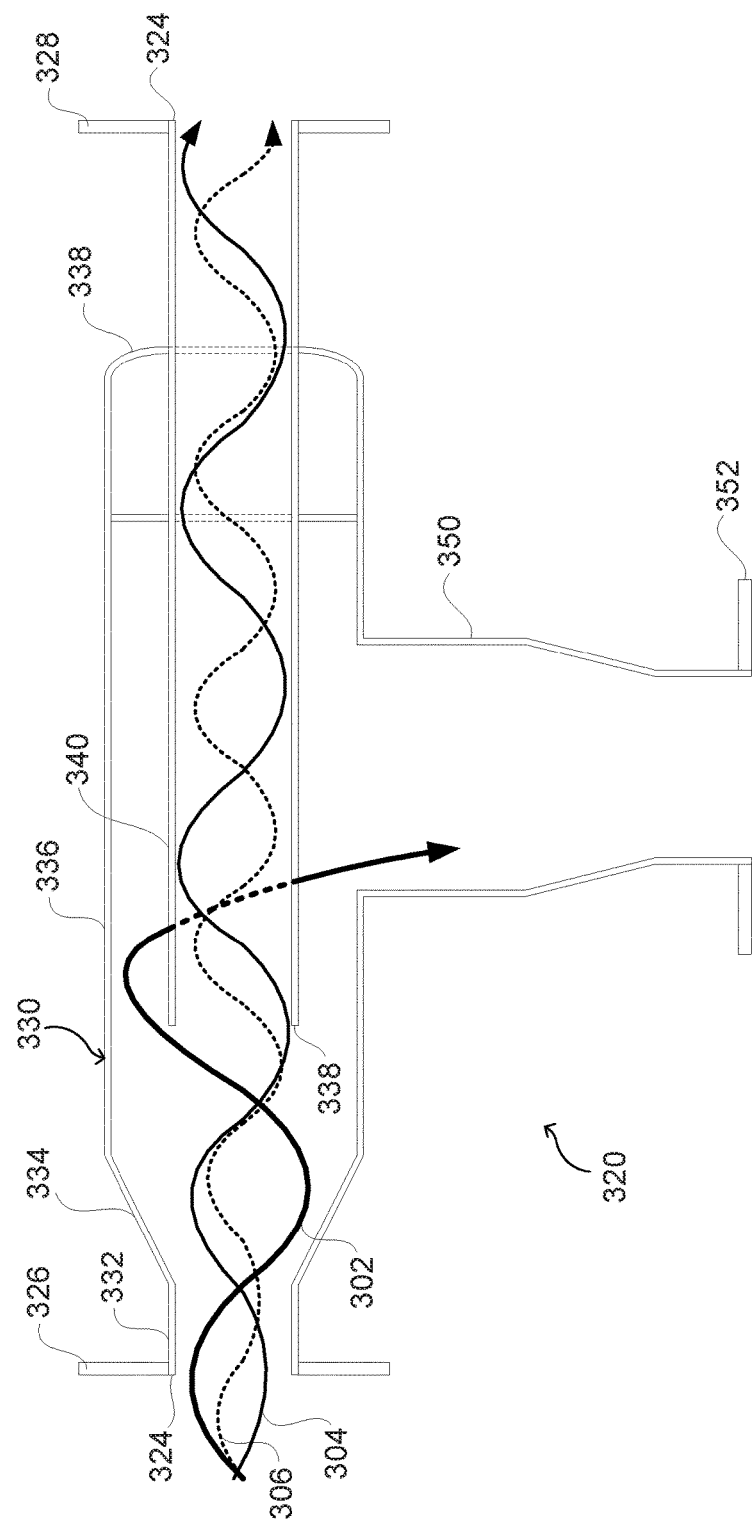
FIG. 10 shows a mixed fluid flow through the separator of FIGS. 9A and 9B.

FIGS. 9A, 9B and 10 illustrate one embodiment of a separator 320, which may be utilized to separate mixed flows (i.e., fluid and particulates and/or mixed fluids) from a helical flow. As shown, the separator 320 has an inlet end 322 and an outlet end 324. The inlet end 322 further includes a flange 326 that is adapted for interconnection with an inlet pipe carrying an organized/helical fluid flow. Such an inlet pipe may be an outlet pipe of one of the flow generators variously discussed in relation to FIGS. 1A-7. The outlet end 324 also includes a flange 328 that is adapted for connection to a downstream pipe (not shown). It will be appreciated that the inlet and outlet ends of the separator 320 may be otherwise connected (e.g., welded) to inlet and outlet pipes or conduits.

In the illustrated embodiment, the inlet end 322 of the separator 320 includes an inlet conduit 332 that extends between the flange 326 and an upstream end of a separation chamber housing 330. The separation chamber housing 330, in the illustrated embodiment, has a conical portion 334, which expands an internal diameter of the separation chamber housing 330 from a first diameter at the connection point with an outlet end of the inlet conduit 332 to a second larger diameter. The larger diameter portion or body portion 336 of the separator chamber housing 330 extends between a downstream end of the conical portion 334 and a terminus end 338 of the separator chamber housing. The conical portion 334 and body portion 336 collectively define an interior 360 of the separator chamber housing 330.

Disposed within the interior 360 of the separator chamber housing 320 is a collection conduit 340, which is axially aligned with the inlet conduit 332. In the present embodiment, an upstream end/inlet 338 (e.g., collection inlet) of the collection conduit 340 is disposed within the body portion 336 of the separator chamber housing 320 downstream of the connection point between the body portion 336 and conical portion 334 of the separation chamber housing 330. Such downstream positioning of the inlet 338 of the collection conduit 332, in the illustrated embodiment, allows for expansion of the mixed fluid flow prior to separation. An outlet end of the collection conduit 340 extends through the terminus end 338 of the housing 330 and forms the outlet end 324 of the separator 320.

Connected to the body portion 336 of the separation chamber housing 330 between its connection with the conical portion 334 and the terminus end 338, is a diversion conduit 350. As shown, the interior of the diversion conduit 350 is in fluid communication with the interior 360 of the separation chamber housing 330. In the illustrated embodiment, an outlet end of the diversion conduit includes a flange 352 for connection to a downstream pipe/conduit.

Referring to FIG. 10, an exemplary operation of the separator 320 is described. As shown, an exemplary mixed helical flow having fluid flows of three densities enters the inlet end 322 of the separator 320. As noted above, the densest fluid 302 is more radially disposed outward than the mid-density fluid 304 and the least dense fluid 306. As the mixed fluid flow enters the conical portion 334 of the separator chamber housing 320, which, in the illustrated embodiment, has an increasing diameter, the velocity of the mixed fluid flow decreases. Accordingly, the radially outward disposition of the different density fluids increases. That is, the conical portion 334 of the separator chamber housing 320 acts as an expansion chamber, which increases the radial disposition of the different fluid flows and reduces turbulence in the mixed fluid flow. Such reduced turbulence allows for more ready separation of the different density fluids. However, it will be appreciated that other embodiments of the separator will not necessarily include a conical portion/expansion chamber. Further, other embodiments of the separator may utilize a conical portion that reduces in diameter to increase the velocity of the mixed fluid flow.

As shown, after entering the conical portion 334, the densest fluid 302 continues to be the most radially outward of the mixed fluid flow. Specifically, the radial disposition of the densest fluid is such that it is disposed radially outward of the inlet 338 of the collection conduit 336. In contrast, the remaining fluid flows 304 and 306, which expand outward in the conical portion 334 of the separator chamber housing, do not expand to a degree that allows these flows to escape the inlet 338 of the fluid collection conduit 332. In this regard, as the mixed fluid flow passes through the separator 320, left to right as illustrated, the densest fluid flow 302 is radially disposed outside the diameter of the collection conduit 336 while the less dense fluids 304 and 306 continue into the inlet 338 of the collection conduit 336 and pass axially through the outlet end 324 of the separator 320. The densest fluid 302 moves around the outside surface of the collection conduit 336 until it is received within the diversion conduit 350.

In the illustrated embodiment, the inlet 338 of the collection conduit 336 is the same diameter as the inlet 322 of the separator 320. Such configuration reduces the pressure drop across the separator 320 as well as back pressure to the inlet 322. However, this is not a requirement. Along these lines, it will be noted that relative diameters of the separator inlet, collection conduit inlet and/or housing may be varied based on one or more parameters. That is, these components may be sized to separate fluid flows based on known or calculated parameters. Such parameters may be associated with the expected fluid flow for the separator. That is, the relative sizes of these components may be selected based on fluid flow velocities, volumes, densities, types of mixed fluids, materials within the fluid flow, and/or other fluid properties. Stated simply, the separator 320 may be designed or otherwise configured to separate a particular fluid flow.

In addition to being configurable to separate a particular fluid flow, it will be appreciated that two or more separators may be utilized in conjunction to separate multiple flows. This is illustrated in FIG. 11, which again illustrates a mixed fluid flow having three densities 302, 304, 306. In the illustrated embodiment, a first separator 320A is disposed in-line with the second separator 320B. In such an arrangement, the outlet of the first separator 320A is interconnected to the inlet of the second separator 320B. As detailed above, the densest fluid 302 entering the first separator 320A is diverted into a first diversion conduit 350A while the mid-density fluid 304 and low-density fluid 306 pass into the first collection conduit 336A, through the first separator 320A, and into the second separator 320B. Once received by the second separator 320B, the densest remaining fluid 304 expands outward in the separation chamber such that it is disposed outside of the second collection conduit 336B. Accordingly, the mid-density fluid 304 may be diverted into a second diversion conduit 350B. In the illustrated embodiment, the least dense fluid 306 continues through the outlet of the second separator 320B. Additional separators may be provided downstream of the second separator 320B.

Figure 11:
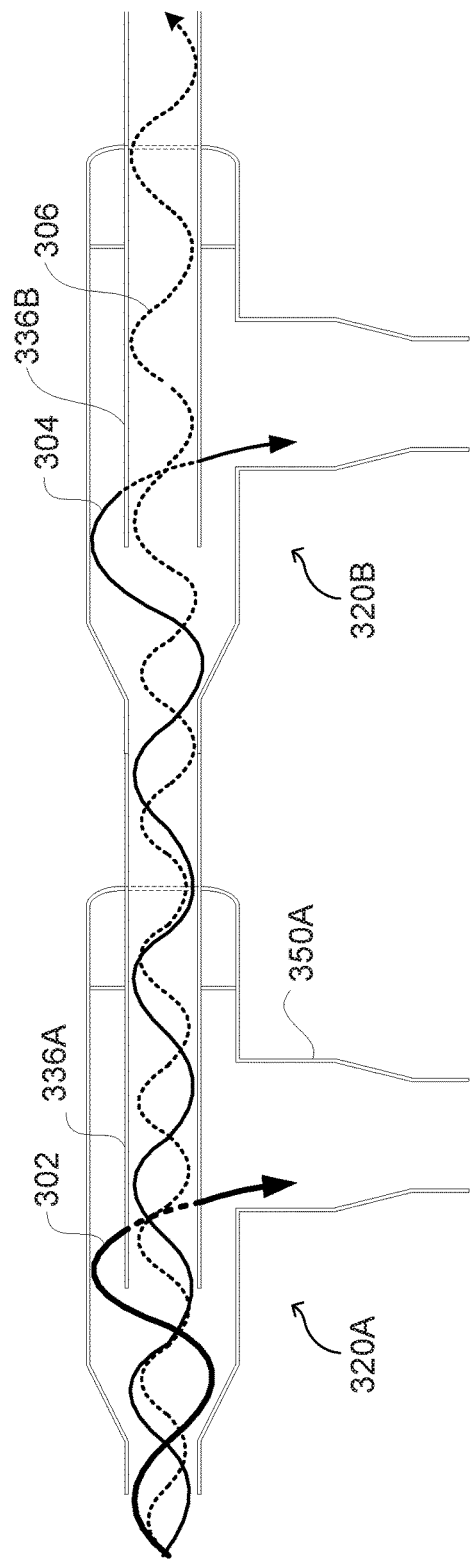
FIG. 11 shows two separators disposed in-line for separating two fluids from a mixed fluid flow.

Though illustrated in FIG. 11 as having the outlet of the first separator 320A directly connected to the inlet of the second separator 320B, it will be appreciated that such direct connection is not required. That is, a length of pipe or conduit may be disposed between the separators. Alternatively, another flow generator (e.g., axial, tangential, etc.) may be disposed between the separators to reestablish a desired helical flow. Likewise, one or more pumps may be disposed between the separators to increase or decrease pressure or velocity if needed.

Figure 12:
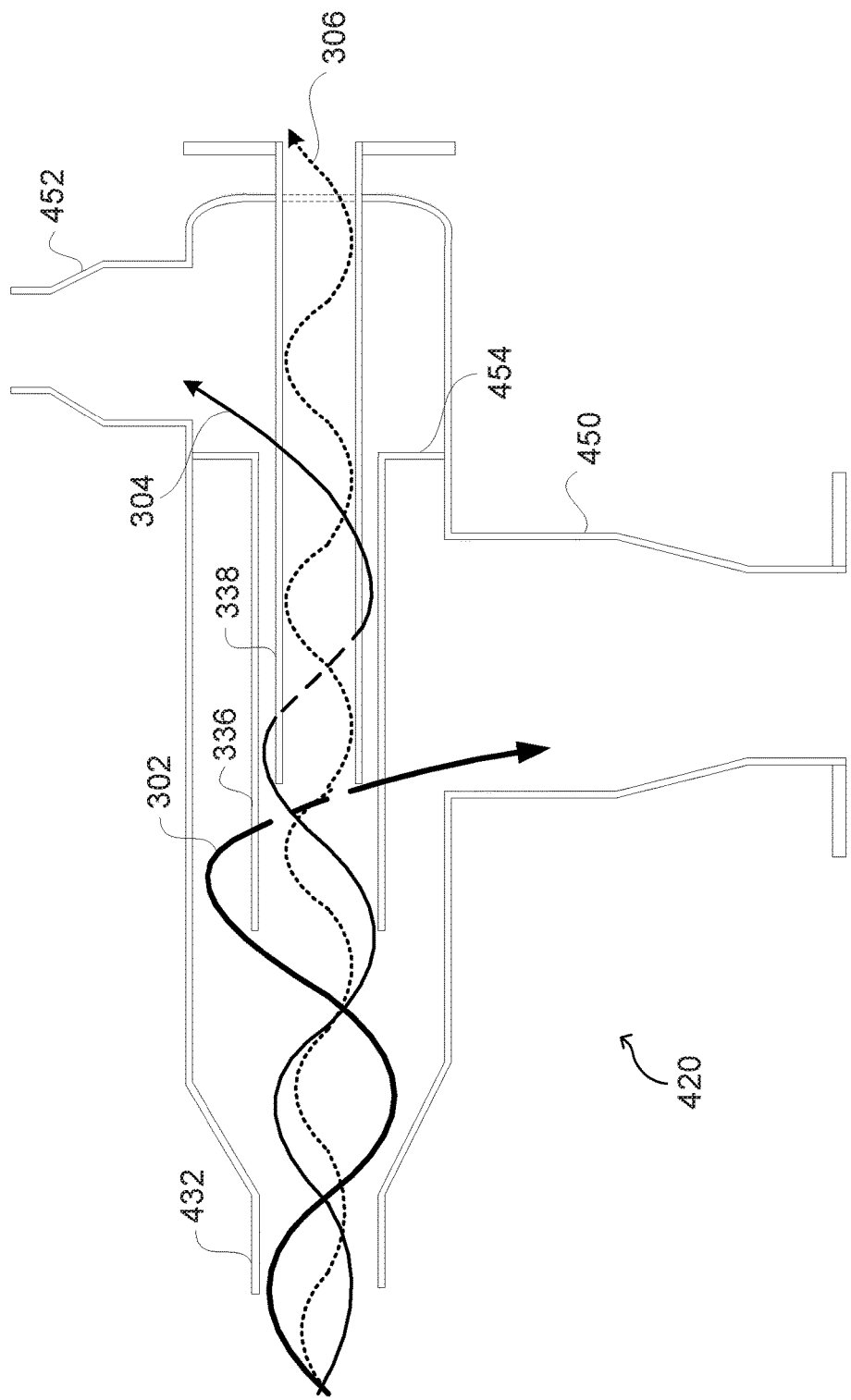
FIG. 12 shows another embodiment of a separator for separating two fluid flows from a mixed fluid flow.

In addition to stacking multiple individual separators to separate multiple fluid flows, it will be appreciated that a single separator may be adapted to separate two or more fluid flows from a mixed fluid flow. FIG. 12 illustrates an embodiment of the separator 420 having first and second 'nested' collection conduits 436, 438 that are disposed in-line with the mixed fluid flow. As shown, the first and second collection conduits 436, 438 are axially aligned with the inlet fluid flow through the inlet conduit 432 of the separator 420. As above, the sizing of the separation chamber, as well as the inlets of the first and second collection conduits 436, 438, may be sized to separate a desired radial portion of the mixed fluid flow from the remainder of the fluid flow. In the illustrated embodiment, the fluid expands upon entering an expanded diameter the separation chamber housing 420. This densest fluid 302 is again diverted through a first diversion conduit 450, which is in fluid communication with the interior of the separation chamber housing. The second densest fluid 304 enters into the inlet of the first collection conduit 336 with the least dense fluid 306. The second densest fluid 304 is disposed radially outside of the inlet of the second collection conduit 338. In this regard, the second densest fluid moves around the outside surface of the second collection conduit 338 and out a second diversion conduit 452 while the least dense fluid 306 continues axially through the separator 420. As shown, the first and second diversion conduits 450 and 452 are fluidly isolated by a baffle 454 attached around the periphery of the first collection conduit 336.

Figure 13:
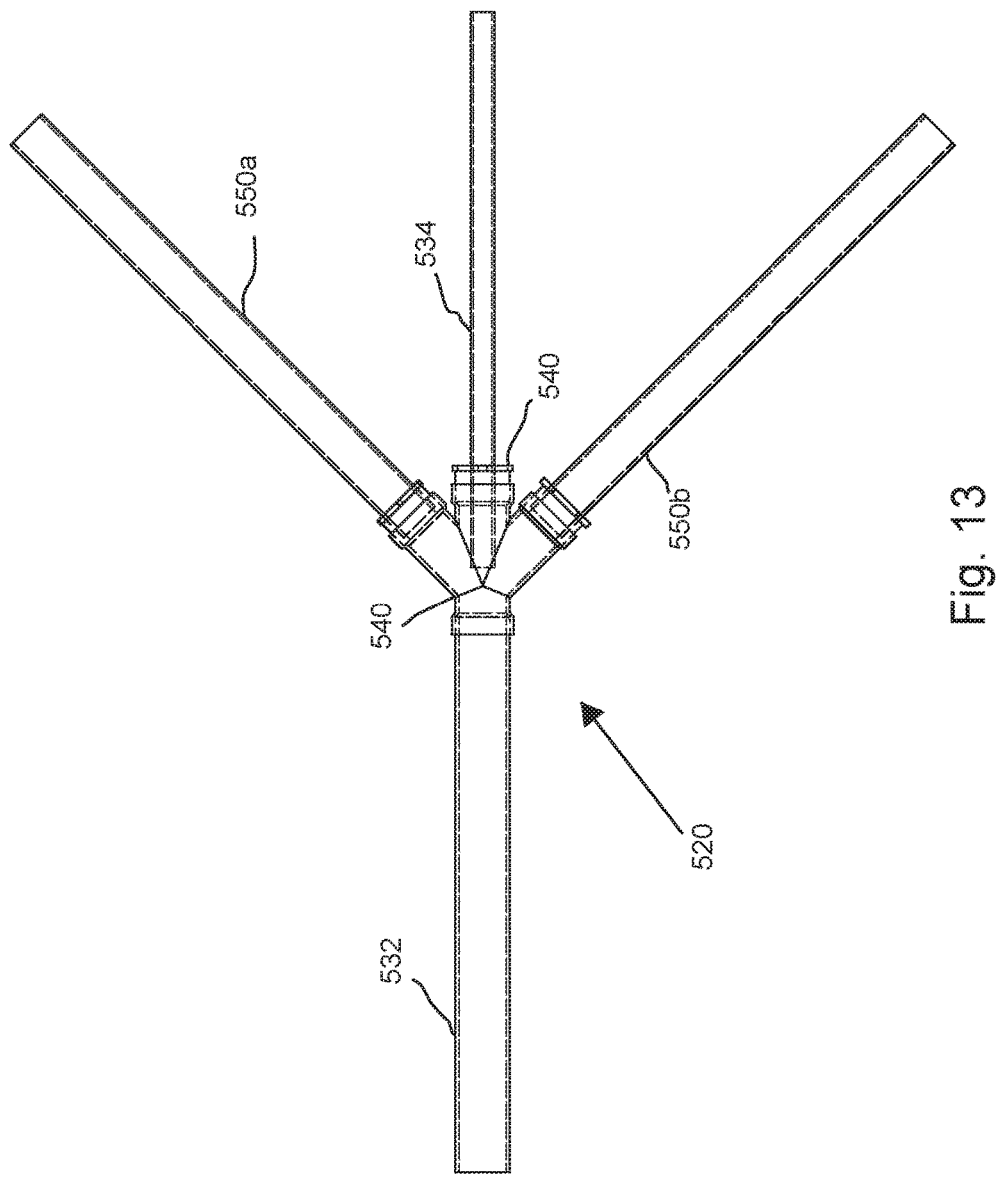
FIG. 13 illustrates another embodiment of a wye separator.

FIG. 13 illustrates another embodiment of a separator 520 that may be utilized to separate a mixed fluid flow. In this embodiment, the separator 520 is configured in what may be termed a 'wye' separator or reducer. As shown, the separator 520 includes an inlet conduit 532 that is adapted to receive a helical flow. The inlet conduit 532 terminates at a wye junction 540 (e.g., housing) that includes first and second diversion conduits 550a and 550b. In the illustrated embodiment, each of the diversion conduits have central axes which are disposed at an angle relative to the central axis of the inlet conduit 532. Disposed in-line with the central axis of the inlet conduit 532 is a collection conduit 534. As shown, the collection conduit 534 is disposed between the first and second diversion conduits 550a, 550b and an inlet end 538 of the collection conduit 534 is disposed into an internal junction 560 of the inlet conduit 532 and diversion conduits 550a and 550b. See FIG. 14.

Figure 14:
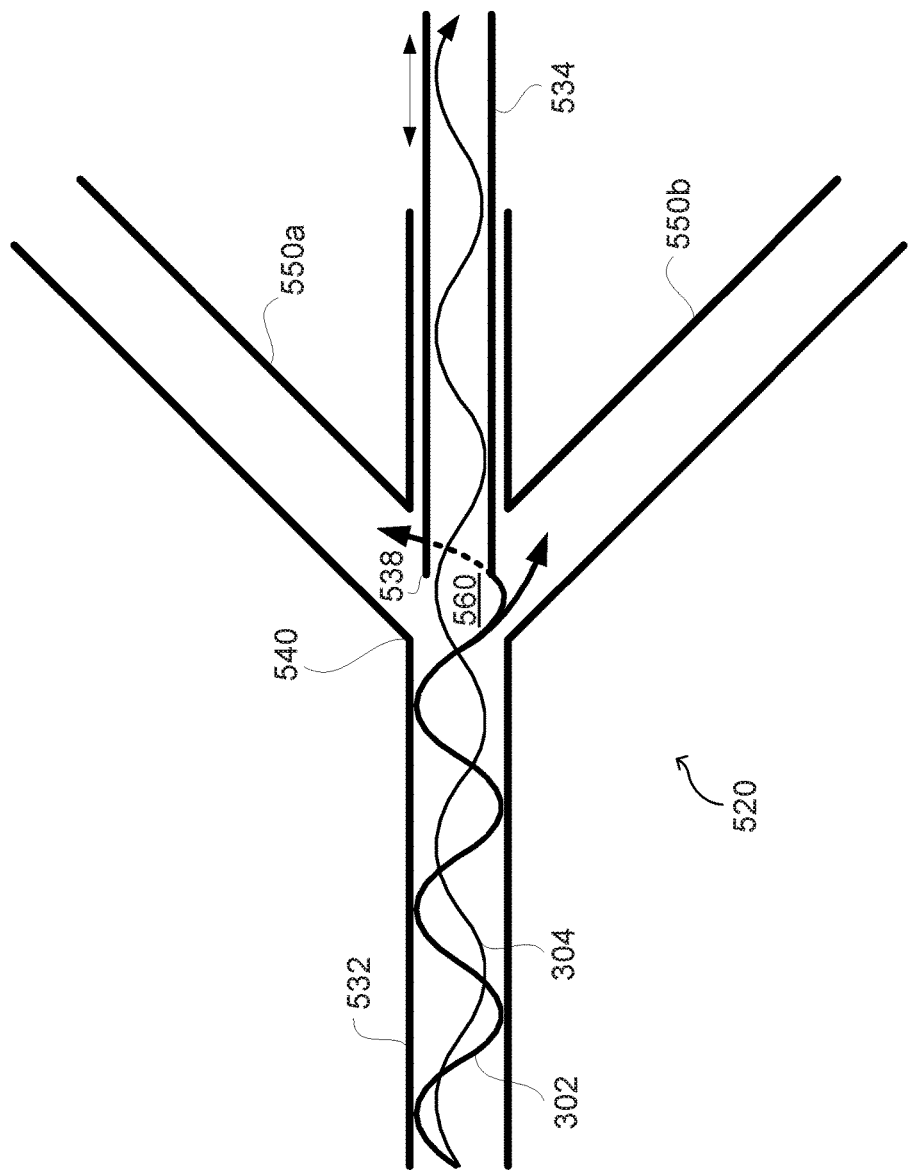
FIG. 14 illustrates a mixed fluid flow through the wye separator of FIG. 13.

FIG. 14 illustrates the operation of the separator 520. As shown, a mixed helical fluid flow having fluids of first and second densities 302, 304 is received by the inlet conduit 532. Once this mixed helical fluid flow reaches the internal junction 560, the fluids 302, 304 expand radially outward. Accordingly, the denser fluid 302 expands radially outward and is received within the first and second diversion conduits 550a and 550b. The less dense fluid 304 enters the inlet end 538 of the collection conduit 534. As above, the less dense fluid continues axially through the collection conduit 534 and exits the separator 520.

In the illustrated embodiment of the separator 520, the axial position of the collection conduit 534 is adjustable relative to the internal junction 560. That is, the inlet end 538 of the collection conduit 534 may be advanced or retracted relative to the internal junction 560 and/or inlet conduit 532 along a centerline axis of the inlet conduit 532. This is illustrated in FIGS. 15A and 15B. Specifically, FIG. 15A illustrates the inlet end 538 advanced upstream of the internal junction 560 into the collection conduit 532 and FIG. 15B illustrates the inlet end 538 retracted relative to the internal junction 560. Such advancement and/or retraction of the inlet end 538 of the collection conduit 534 provide some adjustability of the portion of the mixed helical flow that is diverted into the collection conduit 534. That is, by advancing the inlet end 538 of the collection conduit 534 towards the upstream portion of the internal junction 560 and/or into the inlet conduit 532, a larger internal portion of the helical fluid flow may be diverted into the collection conduit 534. In contrast, retracting the collection conduit 534 allows for separation of the mixed helical fluid flow after expansion of the mixed flow within the internal junction 560. This results in collection of a reduced portion of the helical fluid flow.

To allow for axial movement of the collection conduit 534, a compression fitting 544 may be utilized to interconnect the collection conduit 532 to the wye junction 540. See FIG. 13. As will be appreciated, utilization of a compression coupling also permits for removing and replacing the collection conduit. For instance, collection conduits having different internal diameters may be utilized to allow extraction of different portions of the mixed fluid flow. Likewise, an end cap 552 having a reduced diameter may be fitted over the inlet end of the collection conduit 532. In operation, the selection of an appropriately sized inlet conduit, end cap and/or advancement/retraction of the collection conduit 532 may allow for fine tuning the collection of a desired portion of the fluid flow from the mixed helical fluid flow. For instance, where a vortex airflow exists within the center of the mixed fluid flow, the inlet conduit 532 may be advanced or retracted until a majority or all air within the vortex is collected by the collection conduit 532 and the fluid passing through the diversion tubes 550a, 550b is substantially free of air. Likewise, the collection conduit 532 may be advanced or retracted to allow for selective separation of different density liquids.

The separators discussed above have numerous industrial applications. For instance, in oil and gas applications, it is common for production fluids to have multiple liquid and/or gas components. That is, mixed phase fluids are commonly present. Utilization of one or more of the separators disclosed above may allow for separating various different fluid phases (gases, liquids) and/or particulates from production fluids. For instance, natural gas liquids such as propane and butane may be separated from oils and/or natural gases. Likewise, in gaseous streams, carbon dioxide may be separated from methane gas to provide a cleaner methane gas stream. In another application, hydrogen sulfide particles may be removed from a production fluid stream.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. An organized flow development and separation system, comprising:
    a passive flow development chamber having:
        a flow development housing with an internal chamber, an inlet opening and an outlet opening; and
        at least one diverter disposed within the flow development housing and arranged to circulate a fluid flow received from the inlet opening inside said housing to form a helical fluid flow, wherein said helical fluid flow exits said housing via said outlet opening and wherein said flow development chamber has no moving parts;
    a separator having:
        a separator housing having:
            an inlet conduit fluidly coupled to said outlet opening of said flow development chamber to receive said helical fluid flow; and
            a conical expansion portion connected to said inlet conduit, wherein said conical expansion portion changes from a first diameter at said inlet conduit to a larger second diameter;
        a first collection conduit disposed within said separator housing at an axial location beyond said larger second diameter of said conical expansion portion of said separator housing and having a first collection inlet axially aligned with said inlet conduit; and
        a first diversion conduit fluidly coupled with an interior of said separator housing a location radially outward of the collection conduit, wherein a radially outward first portion of the helical fluid flow is radially disposed outside of said first collection inlet of said first collection conduit and is received by said first diversion conduit and a radially inward second portion of the helical flow is received within said first collection inlet of said first collection conduit.

2. The system of claim 1, wherein a diameter of said first collection inlet of said first collection conduit is substantially equal to a diameter of said inlet conduit.

3. The system of claim 1, further comprising:
    a second collection conduit having a second collection inlet, wherein said second collection inlet is axially aligned with said inlet conduit and said second collection conduit is at least partially disposed within said first collection conduit.

4. The system of claim 3, further comprising:
    a second diversion conduit fluidly coupled with an space between an interior of said first collection conduit and an exterior of said second collection conduit, wherein a radially outward third portion of the helical fluid flow received by said first collection inlet is disposed outside of said second collection inlet of said second collection conduit and is received by said second diversion conduit and a radially inward fourth portion of the helical flow is received within said second collection inlet of said second collection conduit.

5. The system of claim 4, wherein said first diversion conduit and said second diversion conduit are fluidly isolated.

6. The system of claim 1, wherein an axial position of said collection conduit is adjustable along a centerline axis of said inlet conduit.

7. The system of claim 6, further comprising:
    a second diversion conduit fluidly coupled with an interior of said separator housing.

8. The system of claim 7, wherein first and second central axes of said first and second diversion conduits are disposed at a common angle relative to a central axis of said inlet conduit.

9. The system of claim 1, wherein said inlet opening and said outlet opening of said flow development housing are axially aligned.

10. The system of claim 1, wherein a central axis of said inlet opening of said flow development housing is tangential to a central axis of said outlet opening of said flow development housing.

11. A device for separating radial portions of a helical flow, comprising:
    a separator housing with an inlet conduit adapted to receive said helical fluid flow and a conical expansion portion connected to an outlet end of said inlet conduit, wherein said expansion portion expands from a first diameter connected to said outlet end of said inlet conduit to a second larger diameter;
    a first collection conduit disposed within said separator housing and having a first collection inlet axially aligned with said inlet conduit; and
    a first diversion conduit fluidly coupled with a space between an exterior of said first collection conduit and an interior of said separator housing, wherein a radially outward first portion of the helical fluid flow is radially disposed outside of said first collection inlet of said first collection conduit and is received by said first diversion conduit and a radially inward second portion of the helical flow is received within said first collection inlet of said first collection conduit;

an outlet of said first collection conduit exiting said housing, wherein said outlet carries at least a portion of said radially inward second portion of the helical flow.

12. The device of claim 11, wherein said first collection inlet is disposed within said housing at a spaced location from said outlet end of said inlet conduit.

13. The device of claim 12, wherein a diameter of said first collection inlet of said first collection conduit is substantially equal to a diameter of said outlet end of said inlet conduit.

14. The device of claim 11, further comprising:
a second collection conduit having a second collection inlet, wherein said second collection inlet is axially aligned with said inlet conduit and said second collection conduit is at least partially disposed within said first collection conduit.

15. The device of claim 14, further comprising:
a second diversion conduit fluidly coupled with an space between an interior of said first collection conduit and an exterior of said second collection conduit, wherein a radially outward third portion of the helical fluid flow received by said first collection inlet is disposed outside of said second collection inlet of said second collection conduit and is received by said second diversion conduit.

16. The device of claim 11, wherein an axial position of said collection conduit is adjustable along a centerline axis of said inlet conduit.

17. The device of claim 16, further comprising:
a second diversion conduit fluidly coupled with an interior of said separator housing, wherein first and second central axes of said first and second diversion conduits are disposed at a common angle relative to a central axis of said inlet conduit.

18. A method for separating at least a first radial portion of a helical flow from at least a second radial portion of the helical flow, comprising:
advancing a helically fluid flow in an axial flow path through an inlet conduit;
expanding a diameter of said helical fluid flow as the helical fluid flow passes through an outlet of said inlet conduit to define an expanded helical fluid flow, wherein a velocity of said expanded helical fluid flow is reduced in comparison to a velocity of said helical fluid flow;
disposing a first collection conduit having a first collection inlet in axial alignment with said inlet conduit in said axial flow path of said expanded helical fluid flow;
collecting a radially outward first portion of the expanded helical fluid flow between an outside surface of the first collection conduit and an inside surface of a housing associated with said inlet conduit;
collecting a first radially inward second portion of the expanded helical fluid flow within said collection inlet of said first collection conduit; and
advancing said first and second portions of said expanded helical fluid flow in separate conduits after collection.

19. The method of claim 18, further comprising:
disposing a second collection conduit having a second collection inlet in axial alignment with said axial flow path of said expanded helical fluid flow, wherein said second collection inlet collects a second radially inward portion of said first radial inward portion of the expanded helical fluid flow.

20. The method of claim 18, further comprising:
one of advancing and retracting a position of said first collection inlet along the axial flow path of said expanded helical flow to selectively collect said first radial inward second portion of the expanded helical flow.

* * * * *